US010915657B2

(12) United States Patent
Kurtin et al.

(10) Patent No.: US 10,915,657 B2
(45) Date of Patent: Feb. 9, 2021

(54) IDENTIFYING AND PROTECTING PERSONAL SENSITIVE DOCUMENTS

(71) Applicant: Avast Software s.r.o., Prague (CZ)

(72) Inventors: Petr Kurtin, Otrokovice (CZ); Ondřej Vlček, Prague (CZ)

(73) Assignee: Avast Software s.r.o., Prague (CZ)

( * ) Notice: Subject to any disclaimer, the term of this patent is extended or adjusted under 35 U.S.C. 154(b) by 118 days.

(21) Appl. No.: 16/037,997

(22) Filed: Jul. 17, 2018

(65) Prior Publication Data
US 2019/0026488 A1   Jan. 24, 2019

Related U.S. Application Data

(60) Provisional application No. 62/534,458, filed on Jul. 19, 2017.

(51) Int. Cl.
*G06F 21/62* (2013.01)
*G06F 16/951* (2019.01)

(52) U.S. Cl.
CPC ........ *G06F 21/6245* (2013.01); *G06F 16/951* (2019.01)

(58) Field of Classification Search
CPC ............................ G06F 21/6245; G06F 16/951
See application file for complete search history.

(56) References Cited

U.S. PATENT DOCUMENTS

| 7,716,242 | B2 * | 5/2010 | Pae ..................... G06F 21/6227 707/783 |
| 9,917,691 | B2 * | 3/2018 | Roullier ............. G06Q 30/0248 |
| 10,468,026 | B1 * | 11/2019 | Newman ................. G10L 15/04 |
| 2007/0094594 | A1 * | 4/2007 | Matichuk .............. G06F 40/253 715/205 |
| 2011/0040983 | A1 | 2/2011 | Grzymala-Busse et al. |
| 2016/0012037 | A1 | 1/2016 | Gandhi et al. |

FOREIGN PATENT DOCUMENTS

WO    2009062111 A1    5/2009

OTHER PUBLICATIONS

McCallister et al., (Guide to Protecting the Confidentiality of Personally Identifiable Information (PII), NIST 800-122, Apr. 2010, 59 pages) (Year: 2010).*

* cited by examiner

*Primary Examiner* — Oleg Korsak
(74) *Attorney, Agent, or Firm* — Erickson Kernell IP, LLC

(57) ABSTRACT

Systems and methods obtain personal identity information, identify a user's personal documents containing sensitive information, and can optionally protect the sensitive documents. A user's personal identity information can be obtained from various sources such as operating system, email clients, web browsers, Active Directory or from user's documents. The user's documents on hard drives, cloud storage etc. can be searched. Sensitive documents with personal identities are identified and optionally protected against misuse and theft.

18 Claims, 3 Drawing Sheets

IDENTIFYING AND PROTECTING PERSONAL SENSITIVE DOCUMENTS

CROSS-REFERENCE TO RELATED APPLICATIONS

This Application claims priority to U.S. Provisional Patent Application Ser. No. 62/534,458, filed on Jul. 19, 2017, entitled "Identifying and Protecting Personal Sensitive Documents," the entire disclosure of which is incorporated herein by reference.

FIELD

The disclosure relates generally to computer systems, and more particularly, to identifying and protecting personal sensitive documents on computer systems.

BACKGROUND

Personal computing systems typically contain an operating system, applications and user's data. Some personal computers can be cloud-based (e.g. Google® Chromebooks) and can run applications from web servers and also store data to web servers. This default setting can be, however, overridden when a user intends to work offline and the computer can use its own internal disk storage.

A personal computing system is typically personalized to a particular user or users. Such personalization can start very early, for example, when the operation system is being installed. The installation process may ask for various personal information items, such as a user name, a computer name, and a password. For example, the Windows 10 operating system typically asks for a user's email address, and it includes a wizard page that guides the user to create a Microsoft® account where the user is prompted to provide not only a personal email address, but also a first name, last name and country/region. In cases where the operating system is pre-installed by an OEM vendor, i.e., when a new computer or laptop is bought, the installation process can be divided into two parts. The first part consists of installing operating system binary files and configuring hardware drivers. The second part starts when a new customer turns on the computer for the first time. The second part then personalizes the operating system for the customer.

Users can use their computing systems for various activities such as web browsing, handling email communication, managing documents, or downloading documents from the Internet. These documents may contain personal information. Such personal information can be present in official documents (applications, tax return documents), travel documents (visa requests, boarding passes), employee documents and others. Web browsers can be used to download the user's generated documents (e.g. plane tickets, invoices, etc.).

The documents containing personal information are usually sensitive for users and they might be misused when stolen. For example, travel documents (boarding passes, visa requests, or hotel reservations) can help thieves to predict when a person will not be at home and, along with home address information, a thief can know where the user's home is located. Home address is usually present in invoices, either received from online shopping sites as a shipping address, or other invoices such as an electricity bill. Tax documents may reveal payment habits, debts and they can be also misused. For example, a malicious individual can use personal information from a tax document to file an illegitimate tax return with the user's Social Security number to claim a tax refund. Other financial documents users usually store at their computer are related to loans, mortgages etc. Such documents can be also easily misused with some skills in social engineering. For example, a malicious individual could contact a user at home, or call the user's home and the trust of the user can be easily gained when someone knows the financial background of the possible victim. Employee laptops can also contain confidential documents about company plans, internal structure, projections and future plans.

However, given the vast number of documents and the many different types of documents stored on a personal computing system, it can be difficult to analyze them to identify personal information.

SUMMARY OF THE INVENTION

Systems and methods obtain personal identity information, identify a user's personal documents containing sensitive information, and can optionally protect the sensitive documents. A user's personal identity information can be obtained from various sources such as operating system, email clients, web browsers, Active Directory or from user's documents. The user's documents on hard drives, cloud storage etc. can be searched. Sensitive documents with personal identities are identified and optionally protected against misuse and theft.

BRIEF DESCRIPTION OF THE DRAWINGS

For a better understanding of the inventive subject matter, reference may be made to the accompanying drawings in which.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
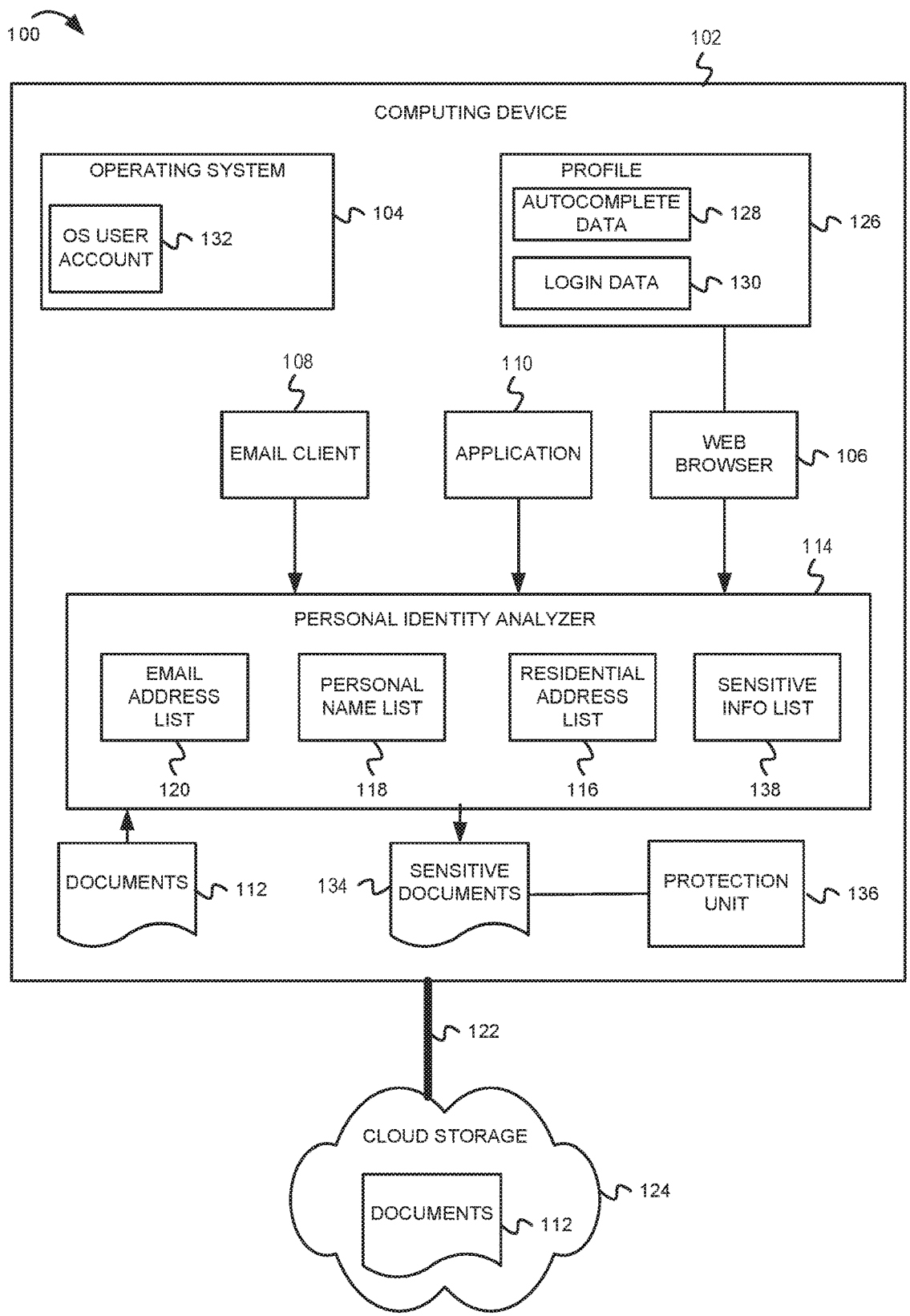
FIG. 1 is a block diagram of an operating environment according to embodiments.

FIG. 1 is a block diagram of an operating environment 100 for a system to identify and protect personal sensitive documents according to embodiments. In some embodiments, operating environment 100 includes a device 102 having an operating system (OS) 104, a personal identity analyzer 114 and various programs that can include a web browser 106, email client 108 and/or application 110. Device 102 may also include a protection unit 136. In some aspects, device 102 can be a desktop computer, a laptop computer, a tablet computer, a server computer, a smart phone, a set top box, a gaming console or any other device with a processor, memory and storage for documents 112.

Operating system 104 controls execution of applications running on device 102 (e.g., web browser 106, email client 108, application 110 etc.). Further, operating system 104 manages the resources of device 102, and provides interfaces between the applications running on device 102 and hardware components of device 102. In some embodiments, operating system 104 can be a version of the Microsoft® Windows® family of operating systems. However, the embodiments are not limited to any particular operating system and in alternative embodiments, operating system 104 can be a version of the Linux operating system, a version of the Chrome OS, a version of the Android™ operating system or a version of the iOS® operating system.

Operating system 104 can maintain OS user account data 132. As an example, on Windows operating systems, OS user account data 132 can include a user name, or first name, a last name and email address.

Installed applications (e.g., web browser 106, email client 108, and application 110) can maintain personal information depending on their purpose. Email client 108 can be any type of email client. Examples of such email clients include Microsoft Outlook®, Mozilla® Thunderbird, etc. Typically, email clients are configured to access a user's personal webmail email server. Configuration details can include the user's email address, first name and last name etc. This personal information can be stored on the user's computing device 102, for example, in a registry, in Active Directory, or on files on a persistent storage unit such as a disk.

Web browser 106 can be any type of web browser. Examples of such web browsers include Internet Explorer®, Microsoft Edge®, Google Chrome®, Opera®, and Mozilla® Firefox®. Web browser 106 can have one or more caches or profiles 126 that contain information that can be used to speed up web browsing as well as provide ease of use. For example, web browser 106 can provide an autocomplete feature (also referred to as autofill) that predicts the rest of a word a user is typing or predicts an entry on a form. The autocomplete feature recognizes the specific fields on a webpage and can provide information from autocomplete data 128 that is directed to the type of field in current use. For example, in a field where a telephone number is expected, web browser 106 will not offer any other cached information except stored telephone numbers. Web browser 106 can include login data 130 that can include login data used to automatically log the user into web sites requiring user authentication. Web browser 106 can also include special support for credit cards so the user doesn't need to enter their credit card information again on eshops (Amazon®, PayPal®, etc.). Such personal information can include the user's full name on the credit card, or support for postal addresses where their ordered package should be delivered. Other cached information can include a residential address, telephone number or company name.

Various web browsers 106 may use different storage mechanisms for profile 126, autocomplete data 128 and/or login data 130. For example, Google Chrome® uses a SQLite® database for autocomplete data 128 where a name column represents the form name (e.g. "firstname", "GivenName", depending on the design of the particular website), value column, number of used suggestions and timestamp when this record was created and used last time. With this information, especially with the number of used suggestions, the system can determine how frequently a given suggestion is used. This information can be used to distinguish desired information from less desired or erroneous information. For example, if the database indicates that "john" has been used fifteen times for a first name field, and "johnn" has been used once, the system can make a prediction that "johnn" is a typographical error, and that "john" is a correct first name. Login data 130 contains similar records for particular websites. Web browser 106 can support multiple profiles 126 in the case that there are multiple users of computing device 102.

Application 110 and email client 108 may have a profile similar to profile 126 that can be used for the same purposes as described above with respect to web browser 106. For example, email client 108 can support multiple profiles 126 in case the user has several email addresses, or the computing device 102 is shared by other family members.

Application 110 can be any type of application running on device 102. In some aspects, application 110 can be an application that accesses sensitive information such as an application that accesses a bank account, a stock trading account, or other financial application. Alternatively, application 110 can be an application that accesses health information. Various items of personal information can be stored in registry entries or files associated with application 110.

Personal identity analyzer 114 can determine various types of personal information present on a computing device 102 such as the information described above. For example, personal identity analyzer 114 can scan the registry and files associated with a web browser 106, email client 108 or application 110 to determine names, identifiers, email addresses, etc. that comprise personal information. Personal identity analyzer 114 can create and maintain an email address list 120, personal name list 118, residential address list 116 and/or sensitive information list 138 that includes the personal information found on the computing device 102. The sensitive information list 138 can include items such as tax identifiers (IDs) (e.g., social security numbers), credit card numbers, telephone numbers, company names etc. Personal identity analyzer 114 can then use email address list 120, personal name list 118, residential address list 116 and/or sensitive information list 138 to scan documents 112 to determine if any of the documents 112 contain personal information. Personal identity analyzer 114 can include such documents containing personal information in sensitive documents 134.

A protection unit 136 may optionally be present on computing device 102. Protection unit 136 can provide additional security for sensitive documents 134. For example, protection unit 136 may require particular permissions, user identification etc. before a document in sensitive documents 134 can be accessed.

Although shown in FIG. 1 as being stored on computing device 102, documents 112 can be stored on cloud storage 124 in addition to, or instead of on computing device 102. Computing device 102 can access cloud storage 124 via one or more wired or wireless networks 122. In some aspects, networks 122 can include the Internet.

Figure 2:
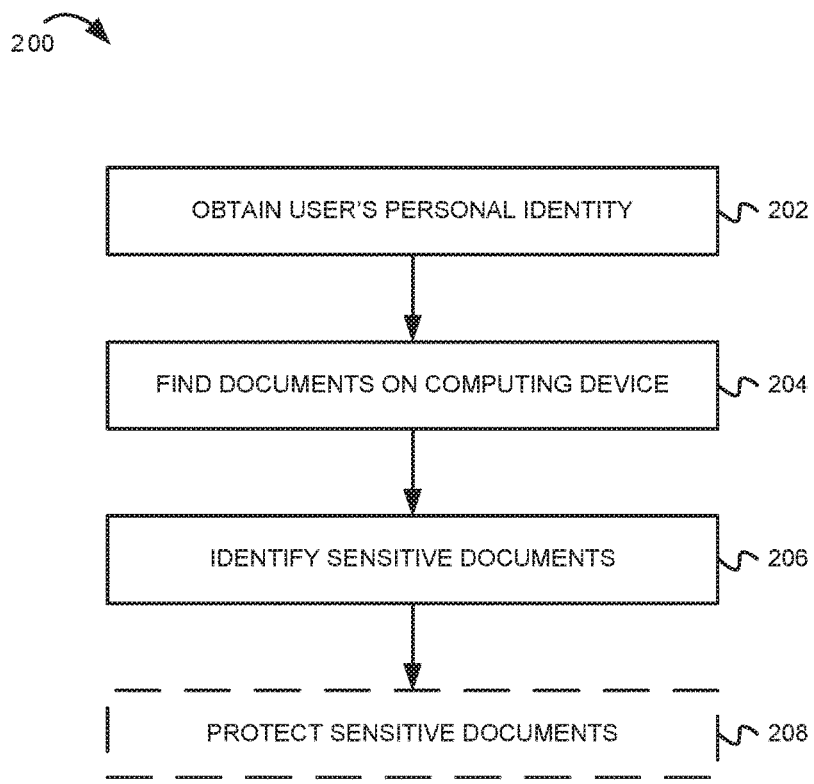
FIG. 2 is a flowchart describing a method for identifying personal sensitive documents according to embodiments.

Further details on the operation of the above described components will be further described with respect to FIG. 2.

FIG. 2 is a flowchart 200 describing a method for identifying personal sensitive documents according to embodiments. The method may, in some aspects, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 2 is inclusive of acts that may be taken by an operating environment 100 executing an example embodiment of the invention.

The method begins at block 202 by obtaining personal identity information. Obtaining personal identity information can be performed various ways, and various combinations of methods can be used. For example, a user can be prompted via a message on the computing device 102 to provide their personal identity information. However, in order to avoid annoying the user, or to handle the case that the user enters invalid information just to dismiss the prompt, or forgets some personal information (i.e., doesn't enter all email addresses in use, doesn't enter information for other users of the device), automated methods of searching for personal identity information can be used in addition to, or instead of prompting the user. For example, the personal identity analyzer 114 can obtain personal identity information such as user name, email address, first (given) name, last (family) name, etc. from OS user account data 132. Further, personal identity information can be obtained from profile 126, autocomplete data 128 or login data 130. Individual fields in the data can be combined if desirable. For example, a "firstname" or "givenname" field can be used in combination with another field (e.g. "lastname", "FamilyName", etc.) to put an entire name together. Timestamp data of the field values (if present) will typically be the same, because they are typically used to enter data on the same web page. Thus, the timestamp data can be used to correlate the individual fields. In some cases, personal identity information in profile 126 may not be readable, or may be incomplete. For example, Internet Explorer® doesn't contain a field name in a human readable format, but instead stores only SHA-1 hash value of such field names. However, common or potential field names can be pre-calculated and used to match exact pre-defined field names in cases where fields are hashed. As an example, the word "firstname" represents "9B0711DD64BFAFDB50CE97C460B59EBF899 20695DE" SHA-1 hash value. If a search of a hashed database found a field that matched the SHA-1 value for "firstname", it can be assumed that the field's unhashed value is "firstname." Similarly, common first names, last names, street names etc. can be pre-hashed and used to perform matching in a database having hashed values. Further, the user's name, address info, etc. can be hashed and used to search a database having hashed values. Other stored information can be used to create a full personal identity including e.g. residential address, company name, credit card numbers, etc.

Personal identity information can also be obtained from installed email clients 108 which are configured for the user to access his webmail email server. Further, personal identity information can be obtained from profiles associated with applications 110.

In the case that the personal identity analyzer 114 doesn't have enough information, it can search for a user's documents 112 (e.g., DOC, PDF, TXT files etc.) and examine the content of such documents. Using partial information, such as first name or email address only, the personal identity analyzer can find one or more documents with this information and examine the content of the document to obtain other missing information.

Once all source inputs are examined, personal identity analyzer 114 evaluates the found results. In some embodiments, the personal identity analyzer 114 can take into account how frequently a field is used if such information is available. For example, if the same first name and email data appears multiple times throughout the set of documents, it can be determined that the first name and/or email address is a primary name and/or email address for the user. Further, in some embodiments, the personal identity analyzer 114 can validate formats of email addresses, credit card numbers, residential addresses, etc. The personal identity analyzer 114 can store the results of the search in one or more lists, e.g., email address list 120, residential address list 116 or personal name list 118.

At block 204, the user's documents are searched. In some embodiments, the user's documents are usually stored in a few well-known formats, such as a text document (e.g., ".TXT" file), a spreadsheet document (e.g., ".XLS" or ".XLSX" file), a word processing document (e.g., a ".doc" or ".docx" file), or Portable Document Format (e.g., ".PDF" file). When searching for the documents 112, personal identity analyzer 114 can search the user's entire set of hard drives and cloud storage, or can take into account the last folders where documents were opened. For example, some applications save these locations in registry settings under "Most Recently Used" (MRU) keys. Using most recently used keys can be used to speed up searching of documents at the risk of missing some folders with stored documents.

At block 206, sensitive documents are identified. For example, the content of the document can be read to determine if the document contains any items of personal identity information such as any of the first name, last name, email address, residential address, tax identifier, credit card data, etc. identified at block 202. The presence of such personal identity information in a document can be used to determine that the document is a sensitive document. A document that does not contain any part of the user's personal identity information is typically not considered as a sensitive document 134. However, in some embodiments, a document might be still considered as a sensitive document 134 if it is stored in the same folder with other sensitive documents, or its file name contains sensitive words, such as "confidential", "invoice", "taxes", etc.

At block 208, the sensitive documents identified at block 206 can optionally be protected, i.e., access to such sensitive documents can be restricted. This is desirable as the sensitive documents might contain information that is private for the user. Protection can be accomplished by using several methods. For example, in some embodiments, protected documents may be encrypted. In alternative embodiments, the sensitive documents may be moved to an external device. For example, the documents can be moved off of an internal drive to an external USB connected hard drive or other memory device. Such devices are typically connected to a laptop or other computing device only when they are needed and usually for a short period of time. Thus if a thief steals user's laptop or other computing device, the thief will likely not also obtain the external hard drive, which may remain at the user's home. In further alternative embodiments, access to the sensitive documents can be restricted to the user's account. This can be achieved non-invasively with a file system filter in kernel mode without changing document's metadata information. The file system filter can check which user account tries to open the sensitive document and allow or block such request depending on whether the account attempting to access the sensitive document belongs to the user, or has the permission of the user.

In some embodiments, access to a sensitive document can be restricted to particular trusted processes in the system. For example, an antivirus software typically knows detailed information about such processes. It can analyze a processes binary code, embedded certificate, behavioral symptoms, or statistical information of running in entire antivirus user base when it queries the antivirus cloud base services. Based on a combination of first occurrence among all antivirus users, origin, popularity, or certificate, the antivirus software can decide how trusted the process is and based on the level of trust, can provide information to the protection unit 136 that can be used to allow or deny access to sensitive documents. If any doubts exist as to whether access should be allowed, protection unit 136 can provide a dialog prompt and let the user decide whether access is to be allowed or denied to the process attempting to access the sensitive document.

As will be appreciated from the above, embodiments of the disclosure can provide improvements to the functioning of a computer. Further the embodiments can provide improvements in the technical field of computer security. As described above, embodiments can improve security for documents that include personally identifying information or other sensitive information that could be used by malicious parties to cause financial or other harm to a user of a computer.

Figure 3:
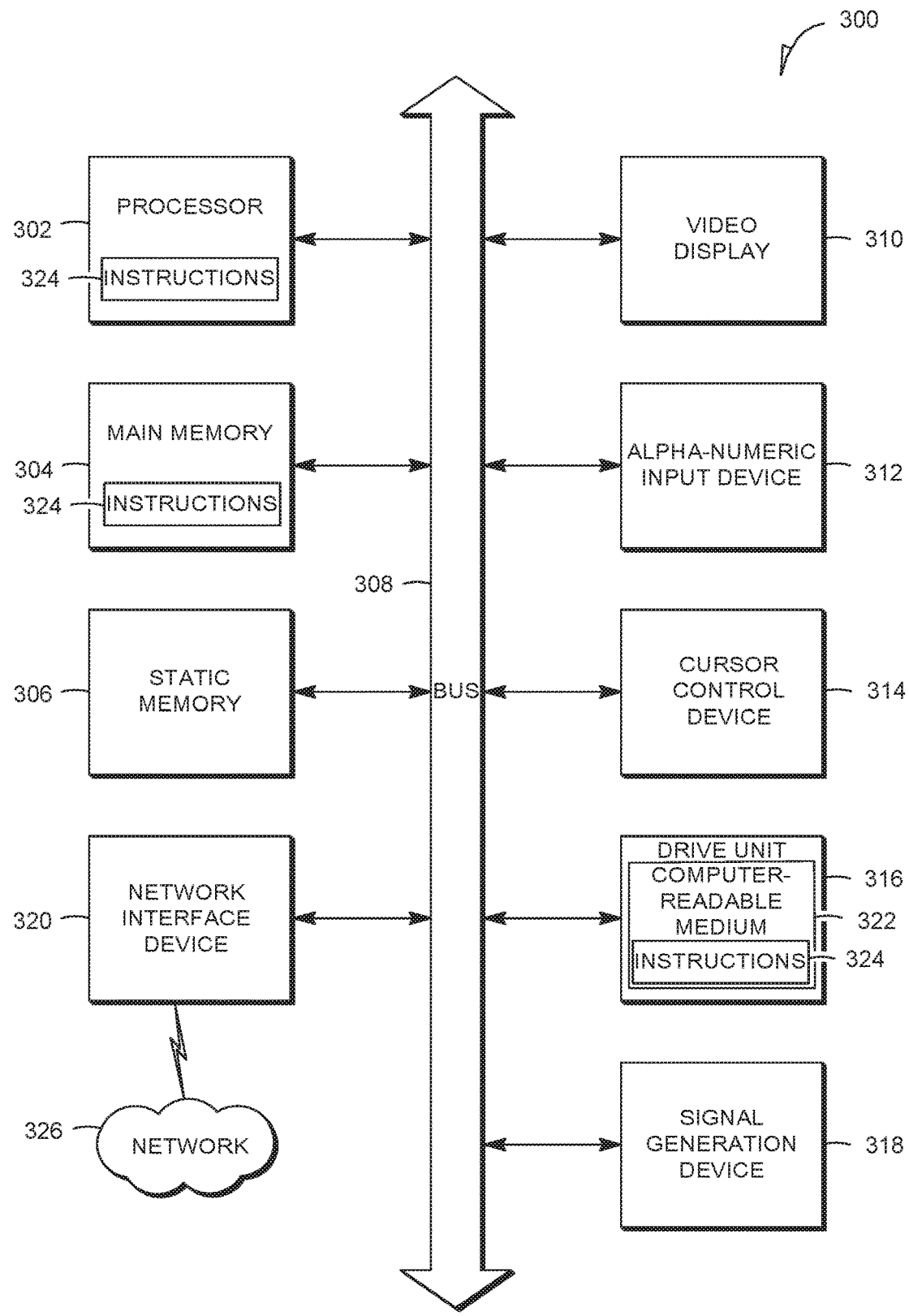
FIG. 3 is a block diagram of an example embodiment of a computer system upon which embodiments of the inventive subject matter can execute.

FIG. 3 is a block diagram of an example embodiment of a computer system 300 upon which embodiments of the inventive subject matter can execute. The description of FIG. 3 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 3 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for identifying sensitive documents, the method comprising:
   obtaining, by one or more processors of a computing device, personal identity information associated with a user;
   determining, by the one or more processors, a set of one or more documents stored on at least one machine-readable medium accessible to the computing device;
   determining that a value of a field having potential personal identity information represents actual personal identity information based on a number of times the value is used;
   determining whether content of a document in the set of one or more documents includes one or more items of the personal identity information, wherein the personal identity information is obtained from at least one of operating system (OS) user account data, a profile associated with an application, autocomplete data and login data; and
   in response to determining that the content of the document includes one or more items of personal identity information, including the document in a set of one or more sensitive documents.

2. The method of claim 1, further comprising protecting the set of one or more sensitive documents.

3. The method of claim 2, wherein protecting the set of one or more sensitive documents includes performing at least one of restricting access to the set of one or more sensitive documents, moving the set of one or more sensitive documents to an external computer readable medium, or encrypting the set of one or more sensitive documents.

4. The method of claim 1, wherein the personal identity information includes at least one member of the group consisting of a name, an address, a tax identifier, a credit card number, and a telephone number.

5. The method of claim 1, wherein the set of one or more documents includes at least one document of the group consisting of a PDF document, a text document, a spreadsheet document, and a word processing document.

6. The method of claim 1, further comprising performing a hash on a value that is potential personal identity information and using the hashed value to search a database having hashed personal identity information.

7. A non-transitory machine-readable medium having stored thereon computer executable instructions for identifying sensitive documents, the computer executable instructions to cause one or more processors to perform operations comprising:
   obtain personal identity information associated with a user of a computing device;
   determine a set of one or more documents stored on at least one machine-readable medium accessible to the computing device;
   determine that a value of a field having potential personal identity information represents actual personal identity information based on a number of times the value is used;
   determine whether content of a document in the set of one or more documents includes one or more items of the personal identity information, wherein the personal identity information is obtained from at least one of operating system (OS) user account data, a profile associated with an application, autocomplete data and login data; and
   in response to a determination that the content of the document includes one or more items of personal identity information, include the document in a set of one or more sensitive documents.

8. The non-transitory machine-readable medium of claim 7, wherein the computer executable instructions further comprise computer executable instructions to protect the set of one or more sensitive documents.

9. The non-transitory machine-readable medium of claim 8, wherein the computer executable instructions to protect the set of one or more sensitive documents include computer executable instructions to perform at least one of restrict access to the set of one or more sensitive documents, move the set of one or more sensitive documents to an external computer readable medium, or encrypt the set of one or more sensitive documents.

10. The non-transitory machine-readable medium of claim 7, wherein the personal identity information includes at least one member of the group consisting of a name, an address, a tax identifier, a credit card number, and a telephone number.

11. The non-transitory machine-readable medium of claim 7, wherein the set of one or more documents includes at least one document of the group consisting of a PDF document, a text document, a spreadsheet document, and a word processing document.

12. The non-transitory machine-readable medium of claim 7, wherein the computer executable instructions further comprise computer executable instructions to perform a hash on a value that is potential personal identity information and using the hashed value to search a database having hashed personal identity information.

13. An apparatus for providing mobile device location based on user consent, the apparatus comprising:
one or more processors; and
a non-transitory machine-readable medium having stored thereon computer executable instructions to cause the one or more processors to:
obtain personal identity information associated with a user of a computing device; determine a set of one or more documents stored on at least one machine-readable medium accessible to the computing device;
determine that a value of a field having potential personal identity information represents actual personal identity information based on a number of times the value is used;
determine whether content of a document in the set of one or more documents includes one or more items of the personal identity information, wherein the personal identity information is obtained from at least one of operating system (OS) user account data, a profile associated with an application, autocomplete data and login data; and
in response to a determination that the content of the document includes one or more items of personal identity information, include the document in a set of one or more sensitive documents.

14. The apparatus of claim 13, wherein the computer executable instructions further comprise computer executable instructions to protect the set of one or more sensitive documents.

15. The apparatus of claim 14, wherein the computer executable instructions to protect the set of one or more sensitive documents include computer executable instructions to perform at least one of restrict access to the set of one or more sensitive documents, move the set of one or more sensitive documents to an external computer readable medium, or encrypt the set of one or more sensitive documents.

16. The apparatus of claim 13, wherein the personal identity information includes at least one member of the group consisting of a name, an address, a tax identifier, a credit card number, and a telephone number.

17. The apparatus of claim 13, wherein the set of one or more documents includes at least one document of the group consisting of a PDF document, a text document, a spreadsheet document, and a word processing document.

18. The apparatus of claim 13, wherein the computer executable instructions further comprise computer executable instructions to perform a hash on a value that is potential personal identity information and using the hashed value to search a database having hashed personal identity information.

\* \* \* \* \*